United States Patent
Nishikiori et al.

[11] Patent Number: 5,814,418
[45] Date of Patent: Sep. 29, 1998

[54] MAGNETO-OPTICAL RECORDING MEDIUM AND METHOD FOR READING OUT INFORMATION FROM THE SAME

[75] Inventors: Keiji Nishikiori, Daito; Yasumori Hino; Masahiro Birukawa, both of Hirakata, all of Japan

[73] Assignee: Matsushita Electric Industrial Co., Ltd., Kadoma, Japan

[21] Appl. No.: 534,182

[22] Filed: Sep. 26, 1995

[30] Foreign Application Priority Data

Sep. 27, 1994 [JP] Japan .................................. 6-258783

[51] Int. Cl.⁶ .................................................. G11B 5/66
[52] U.S. Cl. .......................... 428/694 ML; 428/694 RE; 428/694 MM; 428/694 EC; 428/694 IS; 428/900; 365/13; 365/14; 365/275.2; 365/275.3; 365/122; 360/59; 360/114; 360/131
[58] Field of Search ................... 428/694 ML, 694 RE, 428/694 MM, 694 EC, 694 IS, 900; 365/13, 14, 275.2, 275.3, 122; 360/53, 114, 131

[56] References Cited

U.S. PATENT DOCUMENTS

| | | | |
|---|---|---|---|
| 5,142,513 | 8/1992 | Takehara et al. | 369/13 |
| 5,208,797 | 5/1993 | Nakaki et al. | 369/100 |
| 5,258,237 | 11/1993 | Nakaki et al. | 428/694 EC |
| 5,265,073 | 11/1993 | Osata | 369/13 |
| 5,278,810 | 1/1994 | Takahashi | 369/13 |
| 5,282,095 | 1/1994 | Spruit et al. | 360/59 |

FOREIGN PATENT DOCUMENTS

| | | |
|---|---|---|
| 0352548 | 1/1990 | European Pat. Off. . |
| 395745 | 4/1991 | Japan . |
| 3119537 | 5/1991 | Japan . |
| 512732 | 1/1993 | Japan . |
| 581717 | 4/1993 | Japan . |
| 6103631 | 4/1994 | Japan . |

OTHER PUBLICATIONS

Ota et al, Nikkei Electronics, No. 539, pp. 223–233, 1991, "Development of Magneto–Optical Disk Realizing Double or Higher Density Reproduction".

*Primary Examiner*—Leszek Kiliman
*Attorney, Agent, or Firm*—Renner, Otto, Boisselle & Sklar

[57] ABSTRACT

In one embodiment, the magneto-optical recording medium of the present invention has a recording layer structure including at least a readout magnetic film, a control magnetic film, and a recording magnetic film. The readout magnetic film is a perpendicular magneto-anisotropy film at a temperature in a predetermined range. The control magnetic film provided between the readout magnetic film and the recording magnetic film has a prescribed structure so as to assume a perpendicular magneto-anisotropy film at a temperature in a predetermined range and an in-plane magneto-anisotropy film at a temperature in a range other than the predetermined range. By irradiating the medium with a readout light, information recorded as a magnetized direction of a domain on the recording magnetic film is copied onto the readout magnetic film through the control magnetic film by an exchange-coupled force in a region whose temperature allows both of the readout magnetic film and the control magnetic film to be perpendicular magneto-anisotropy films. The thus copied information is read out by utilizing the magneto-optical effect of reflected readout light.

10 Claims, 10 Drawing Sheets

MAGNETO-OPTICAL RECORDING MEDIUM AND METHOD FOR READING OUT INFORMATION FROM THE SAME

BACKGROUND OF THE INVENTION

1. Field of the Invention

The present invention relates to a magneto-optical recording medium in which information is recorded or erased by utilizing the increase in temperature of the medium caused by the irradiation of a laser beam and the recorded information is read out by utilizing a magneto-optical effect, and a method for reading out the recorded information from the medium.

2. Description of the Related Art

In magneto-optical recording, a magnetic film is locally heated to the Curie temperature or higher, or to a compensation temperature or higher, by the irradiation of a laser beam. This allows an irradiated portion of the magnetic film to be magnetized in the direction of an external magnetic field to form domains.

Examples of recording methods in magneto-optical recording media include a magnetic field modulation recording method and a light power modulation recording method. According to the magnetic field modulation recording method, a laser beam with a predetermined constant intensity is irradiated on a recording magnetic film so as to raise the temperature thereof, and an external magnetic field of which direction is modulated in accordance with a recording signal indicative of information to be recorded is impressed to the heated magnetic film so as to locally change the magnetized direction thereof, whereby information is thermo-magnetically recorded on the magnetic film. On the other hand, according to the light power modulation recording method, an external magnetic field with a predetermined constant intensity is impressed to a recording magnetic film, and a laser beam of which intensity is modulated in accordance with a recording signal is irradiated on the magnetic film so as to locally raise the temperature of the magnetic film, whereby information is thermo-magnetically recorded.

In conventional magneto-optical recording media, when each domain is smaller than a spot diameter of a readout laser beam, the laser beam detects fore-and-aft domains of the intended one. The interference between the adjacent domains causes a readout signal indicative of read information to be small, resulting in the decrease in an S/N ratio.

In order to solve the above-mentioned problem, a magneto-optical recording method as shown in FIGS. 9(a) and 9(b) has been proposed (Nikkei Electronics, No. 539, pp. 223 to 233, issued on 28th Oct., 1991). Hereinafter, this magneto-optical recording method will be briefly described.

FIG. 9(a) is a plan view showing a part of a track of a magneto-optical recording medium 160. FIG. 9(b) is a cross-sectional view taken along a line 9B—9B of FIG. 9(a).

Referring to FIG. 9(b), the medium (specifically, a magneto-optical disk) 160 includes a readout magnetic film 163, a copying magnetic film 164, an intermediate film 165, and a recording magnetic film 166 layered on a substrate (not shown) in this order. In this figure, an arrow X in a horizontal direction represents a moving direction along tracks of the medium 160; an upward arrow 161 represents a magnetic field for recording and readout of information, and a downward arrow 162 represents an initialization magnetic field.

As shown in FIG. 9(a), when information is read out from the medium 160, a laser beam is irradiated along an intended track to form a readout light spot 167 thereon.

When a laser beam is irradiated to the rotating medium 160 and the readout light spot 167 is formed thereon, the temperature distribution of the magnetic films including the readout magnetic film 163 and the copying magnetic film 164 is not rotation-symmetric with respect to a central point of the readout light spot 167.

More specifically, a region 169 of the track, which has already been irradiated with a laser beam, becomes a high temperature region 169 whose temperature increases to the Curie temperature $T_c$ or higher of the copying magnetic film 164, and a part of the region 169 is included in the readout light spot 167.

A crescent portion 170, which is outside of the high temperature region 169 and is included in the left half of the readout light spot 167, is an intermediate temperature region 170 whose temperature increases to an intermediate range. Furthermore, a portion 171, which is in the right side of the intermediate temperature region 170 and is included in the readout light spot 167, is a low temperature region 171 whose temperature is kept relatively low.

In the medium 160, a signal (information) is assumed to be previously thermo-magnetically recorded on the recording magnetic film 166 as domains 168. The copying magnetic film 164 is strongly exchange-coupled to the readout magnetic film 163. The intermediate film 165 is provided so that domain walls are stabilized when the magnetized direction of the readout magnetic film 163 is aligned with that of the recording magnetic film 166.

Hereinafter, the readout operation of the medium 160 thus constructed will be described.

The initialization magnetic field 162 is impressed to the medium 160 so that the magnetized direction of the readout magnetic film 163 is aligned with the direction of the initialization magnetic field 162 (e.g., downward in FIG. 9(b)). During readout, a readout laser beam is irradiated on the rotating medium 160 in a range of x1 to x2 as shown in FIG. 9(b). This raises the temperature of the medium 160, forming a temperature distribution thereon as described above with reference to FIG. 9(a).

The coercive force of the readout magnetic film 163 decreases due to the increase in temperature of the readout magnetic film 163; therefore, in the intermediate temperature region 170, the exchange-coupled force between the recording magnetic film 166 and the readout magnetic film 163 becomes predominant. Thus, the magnetized direction of the readout magnetic film 163 is aligned with that of the recording magnetic film 166.

Furthermore, the magnetization of the copying magnetic film 164 drastically decreases in the high temperature region 169 where the temperature is the Curie temperature $T_c$ or higher. Because of this, in this region, the exchange-coupled force between the readout magnetic film 163 and the recording magnetic film 166 is cut off, so that the magnetized direction of the readout magnetic film 163 is aligned with the direction of the readout magnetic field 161 (e.g., upward in FIG. 9(b)). Thus, the low temperature region 171 and the high temperature region 169 in the readout light spot 167 mask the fore-and-aft domains 168, and information is read out from only a specified domain 168x in the intermediate temperature region 170 as a readout signal.

As described above, even when the domain 168 is smaller than the readout light spot 167, information can be read out from the domain 168 with high density without causing any interference from the fore-and-aft domains.

Furthermore, a magneto-optical recording medium 180 as shown in FIGS. 10(a) and 10(b) has been proposed (Japanese Laid-Open Patent Publication No. 5-81717). FIG. 10(a) is a plan view showing a part of a track of the medium 180. FIG. 10(b) is a cross-sectional view taken along a line 10B—10B of FIG. 10(a).

The medium 180 includes a readout magnetic film 182 and a recording magnetic film 183 on a substrate (not shown) in this order as shown in FIG. 10(b). Unlike the medium 160 shown in FIGS. 9(a) and 9(b), an in-plane magneto-anisotropy film is used as the readout magnetic film 182.

An arrow X in FIG. 10(b) represents a moving direction along the tracks of the medium 180. In the same manner as that in the medium 160 described with reference to FIGS. 9(a) and 9(b), during readout of information from the medium 180, a laser beam is irradiated along an intended track of the medium 180 in a range of x1 to x2 of FIG. 10(b) to form a readout light spot 186.

When a laser beam is irradiated on the rotating medium 180 and the readout light spot 186 is formed thereon, the temperature distribution of the magnetic films including the readout magnetic film 182 and the recording magnetic film 183 is not rotation-symmetric with respect to a central point of the readout light spot 186.

More specifically, a region 187 of the track, which has already been irradiated with a laser beam, becomes a high temperature region 187 and a part of the region 187 is included in the left half of the readout light spot 186. The other region 188 of the readout light spot 186, i.e., a region which is included in the readout light spot 186 and is not included in the high temperature region 187, is a low temperature region 188 whose temperature is kept relatively low. In this case, a domain 189 is much smaller than the readout light spot 186.

Hereinafter, the readout operation of the medium 180 thus constructed will be described.

A recorded signal is assumed to be previously thermomagnetically recorded in each domain 189 of the recording magnetic film 183. The readout magnetic film 182 is an in-plane magneto-anisotropy film at room temperature, and only a portion corresponding to the high temperature region 187 in the readout light spot 186 is a perpendicular magneto-anisotropy film. When a laser beam for readout is irradiated on the medium 180 in a range of x1 to x2 of FIG. 10(b), the temperature of this irradiated portion increases so that the high temperature region 187 and the low temperature region. 188 are formed.

In the high temperature region 187, the readout magnetic film 182 changes to a perpendicular magneto-anisotropy film, and the magnetized direction thereof is aligned with that of the recording magnetic film 183 by exchange-coupled force. When the medium 180 moves in the X direction and the temperature thereof decreases, the readout magnetic film 182 shifts to an in-plane magneto-anisotropy film. Thus, information in the domain 189 which is smaller than the readout light spot 186 can be read out without using an initialization magnetic field.

However, the above-mentioned conventional magneto-optical recording media 160 and 180 respectively have the following problems.

In the above-mentioned medium 160, an initialization magnetic field 162 is required for the purpose of performing an initialization operation for aligning the magnetized direction of the readout magnetic film 163 with a predetermined direction prior to aligning the magnetized direction of the readout magnetic film 163 with that of the recording magnetic film 166.

On the other hand, although the medium 180 using an in-plane magneto-anisotropy film as the readout magnetic film 182 has an advantage in that the initialization magnetic field is not required, it has the following drawbacks.

(1) The critical temperature at which the readout magnetic film 182 changes from an in-plane magneto-anisotropy film to a perpendicular magneto-anisotropy film is constant. Thus, when a readout power of a laser beam varies, regions where domains 189 are copied are changed. As a result, the interaction from the adjacent domains degrades readout characteristics.

(2) The magnetization of the readout magnetic film 182 is attracted in the magnetized direction of the recording magnetic film 183 by an exchange-coupled force therebetween. Because of this, the magnetized direction in the readout magnetic film 182 has a perpendicular component, being unable to maintain the ideal in-plane magneto-anisotropy. As a result, copying is conducted even in regions where the copying of the domains 189 is not required, and hence sufficient resolution cannot be obtained at a time of readout of information.

SUMMARY OF THE INVENTION

In one embodiment, the magneto-optical recording medium of this invention includes a substrate, and a recording layer structure including at least a readout magnetic film, a control magnetic film, and a recording magnetic film formed on the substrate, wherein the recording magnetic film is a perpendicular magneto-anisotropy film which is magnetized by being irradiated with recording light so as to be heated and by being impressed with a recording magnetic field, on which information to be recorded is recorded and stored in the form of a magnetized direction of a domain, the readout magnetic film is a perpendicular magneto-anisotropy film at a temperature in a predetermined range, and readout light is irradiated on the recording layer structure so that the magnetized direction of the domain of the recording magnetic film is copied onto the readout magnetic film to read out the recorded information, the control magnetic film is provided between the readout magnetic film and the recording magnetic film so as to control working of an exchange-coupled force between the readout magnetic film and the recording magnetic film, the control magnetic film being a perpendicular magneto-anisotropy film at a temperature in a predetermined range and an in-plane magneto-anisotropy film at a temperature in a range other than the predetermined range, and information recorded on the recording magnetic film is copied onto the readout magnetic film through the control magnetic film by the exchange-coupled force in a region of the recording layer structure having a temperature at which the readout magnetic film and the control magnetic film are both perpendicular magneto-anisotropy films.

In one embodiment, the method of this invention for reading out information from a magneto-optical recording medium having a substrate and a recording layer structure including at least a readout magnetic film, a control magnetic film, and a recording magnetic film formed on the substrate, the Information being recorded and stored in the form of a magnetized direction of a domain on the recording magnetic film by irradiating recording light on and thereby heating the recording magnetic film and by impressing a recording magnetic field to the recording magnetic film, the information being read out from the magneto-optical recording medium by copying the magnetized direction of the domain of the recording magnetic film onto the readout magnetic film via the control magnetic film by an exchange-coupled force through irradiation of a readout light, includes the steps of: irradiating the readout light on and thereby heating the recording layer structure, raising a temperature in a predetermined region of the control magnetic film to a temperature equal-to or higher than a predetermined temperature which is higher than room temperature so as to allow the control magnetic film to shift from an in-plane magneto-anisotropy film to a perpendicular magneto-anisotropy film, thereby copying information recorded on the recording magnetic film onto the readout magnetic film through the control magnetic film by the exchange-coupled force; and reading out the information copied onto the readout magnetic film by utilizing reflected readout light from the readout magnetic film.

Thus, the invention described herein makes possible the advantages of (1) providing a method for reading out information from a magneto-optical recording medium having high-performance readout characteristics with high resolution, not requiring an initialization magnetic field, by allowing a recorded signal to be read out from an intermediate temperature region in a readout light spot; and (2) providing a magneto-optical recording medium suitable for high-density recording, using the aforementioned readout method.

These and other advantages of the present invention will become apparent to those skilled in the art upon reading and understanding the following detailed description with reference to the accompanying figures.

DESCRIPTION OF THE PREFERRED EMBODIMENTS

A magneto-optical recording medium in each embodiment of the present invention will be described with reference to the drawings.

Embodiment 1

Figure 1:
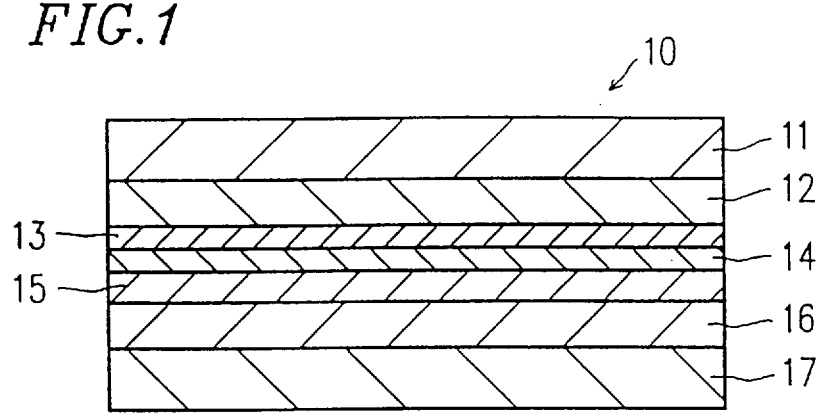
FIG. 1 is a cross-sectional view showing a structure of a magneto-optical recording medium in each embodiment of the present invention.

FIG. 1 is a cross-sectional view showing a structure of a magneto-optical recording medium 10 in Embodiment 1 of the present invention.

The medium 10 includes a first protection film 12, a readout magnetic film 13, a control magnetic film 14, a recording magnetic film 15, a second protection film 16, and a protection layer 17 on a substrate 11 in this order.

More specifically, the substrate 11 is to be a substrate for a magneto-optical disk, and is made of glass, plastic, or the like. The first protection film 12 and the second protection film 16 are prepared of, for example, ZnS.

The readout magnetic film 13 is used for reading out information and is prepared of GdFeCo, which assumes an in-plane magneto-anisotropy film in temperature range from room temperature to a predetermined temperature lower than a compensation temperature $T_{comp}$, and assumes a perpendicular magneto-anisotropy film at around the compensation temperature $T_{comp}$. Herein, the compensation temperature $T_{comp}$ refers to a critical temperature at which the spontaneous polarization of the magnetic films rapidly decrease due to the increase in temperature and the direction of the spontaneous polarization reverses. The maximum coercive force of the magnetic film is obtained at the compensation temperature $T_{comp}$.

The control magnetic film 14 is prepared of GdFeCo, and shifts from an in-plane magneto-anisotropy film to a perpendicular magneto-anisotropy film at a higher temperature compared with the readout magnetic film 13. The recording magnetic film 15 is prepared of TbFeCo, and records and stores information in the form of the direction of perpendicular magnetization of domains. The protection layer 17 is made of, for example, an epoxyacrylate resin.

Each magnetic film constituting the medium 10 is formed on the substrate 11 by sputtering or evaporation. After each magnetic film is formed, the protection layer 17 is formed thereon by spin coating. The thickness of each film is typically as follows: The first protection film 12 and the second protection film 16 respectively have a thickness of about 60 to about 120 nm, e.g., about 80 nm; the readout magnetic film 13 has a thickness of about 10 to about 80 nm, e.g., about 50 nm; the control magnetic film 14 has a thickness of about 5 to about 50 nm, e.g., about 10 nm; and the recording magnetic film 15 has a thickness of about 30 to about 100 nm, e.g., about 50 nm.

Figure 2A:
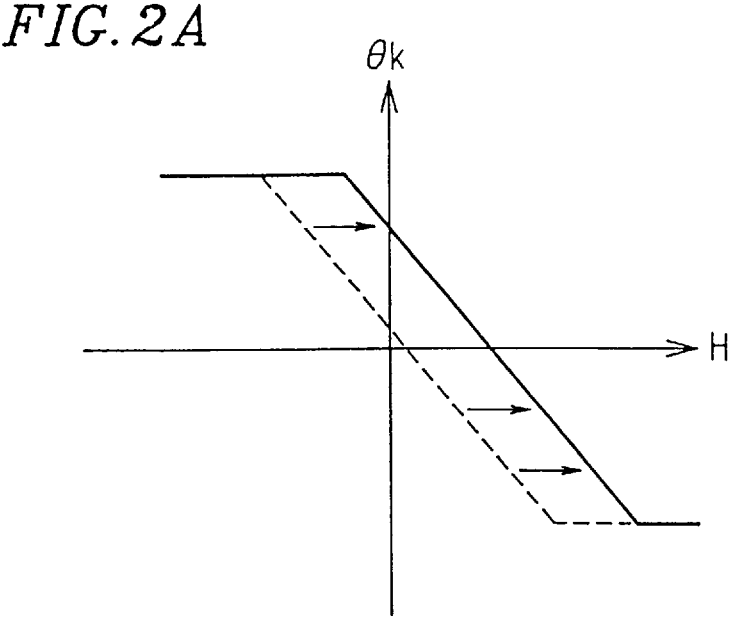
FIG. 2A is a graph showing a Kerr hysteresis loop characteristic of a conventional magneto-optical recording medium.
Figure 2B:
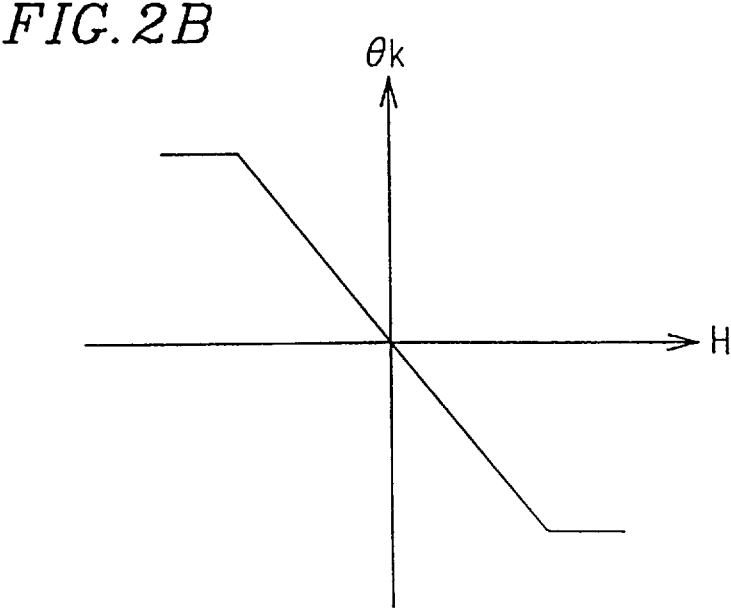
FIG. 2B is a graph showing a Kerr hysteresis loop characteristic of a magneto-optical recording medium in Embodiment 1 of the present invention.

FIGS. 2A and 2B show schematic Kerr hysteresis loops at room temperature, as seen from the medium 10 from the side of the substrate 11. Specifically, FIG. 2A shows a Kerr hysteresis loop of a conventional magneto-optical recording medium having a double-layered structure of a recording magnetic film and a readout magnetic film, and FIG. 2B shows a Kerr hysteresis loop of the medium 10 of Embodiment 1 shown in FIG. 1. In both cases shown In FIGS. 2A and 2B, the horizontal axis represents the intensity H of applied magnetic field, and the vertical axis represents the Kerr rotation angle $\theta_k$, and the recording magnetic films are magnetized in one direction.

The Kerr hysteresis loop of magneto-optical recording medium is supposed to pass the point of origin of a graph; however, the hysteresis loop of the conventional magneto-optical recording medium shown in FIG. 2A is shifted along the magnetized direction of the recording magnetic film (i.e., in the positive horizontal direction in FIG. 2A). This is because the exchange-coupled force between the readout magnetic film and the recording magnetic film allows the magnetized direction of the readout magnetic film to have a considerable amount of a perpendicular component even when an applied magnetic field H is 0.

In contrast, in the medium 10 of Embodiment 1 of the present invention having the characteristic shown in FIG. 2B, the control magnetic film 14 which is an in-plane magneto-anisotropy film at room temperature ($<T_{sw}2$) is provided between the readout magnetic film 13 and the recording magnetic film 15; thus, the exchange-coupled force between the readout magnetic film 13 and the recording magnetic film 15 is controlled so as not to affect the readout magnetic film 13.

Figure 3A:
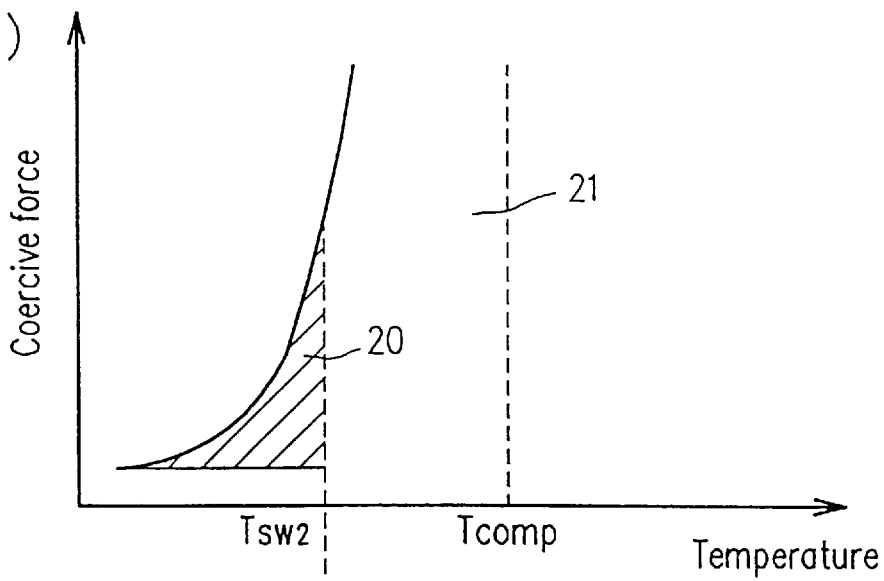
FIG. 3(a) is a graph showing temperature dependence of a coercive force in a control magnetic film of the magneto-optical recording medium in Embodiment 1 of the present invention.
Figure 3B:
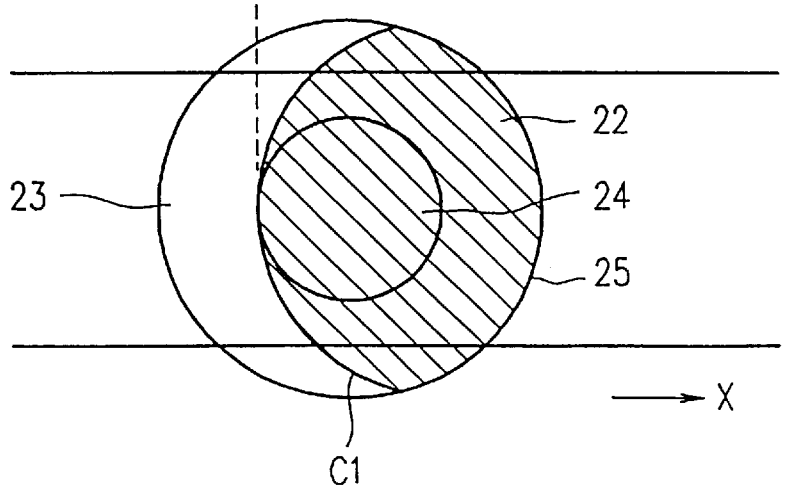
FIG. 3(b) is a view showing a temperature distribution of a readout light spot along a track of the magneto-optical recording medium in Embodiment 1 of the present invention.

Next, FIG. 3(a) is a graph showing a temperature characteristic of a coercive force of the control magnetic film 14 in the medium 10. FIG. 3(b) is a partial upper face view of the medium 10, showing the vicinity of a readout light spot 25 with respect to a track.

In FIG. 3(a), a horizontal axis represents temperatures in the range from room temperature to $T_{sw}2$ and further to the compensation temperature $T_{comp}$. In FIG. 3(b), a region defined by a curve C1 represents a range of the control magnetic film 14 which is heated to $T_{sw}2$ or higher when a laser beam is irradiated on a track of the medium 10 to form the readout light spot 25. The control magnetic film 14 in the medium 10 of Embodiment 1 assumes an in-plane magneto-anisotropy film in a region 20, shown in FIG. 3(a), where the temperature is lower than $T_{sw}2$ and assumes a perpendicular magneto-anisotropy film in a region 21 where the temperature is $T_{sw}2$ or higher.

As shown in FIG. 3(b), when a laser beam is irradiated on the rotating medium 10 in the same way as in the conventional example to form the readout light spot 25 on the medium 10, a temperature distribution of the readout magnetic film 13 and the control magnetic film 14 shifts toward the moving direction of the medium 10 with respect to a central point of the readout light spot 25.

Here, it is assumed that a domain 24 is present at the central portion of the readout light spot 25. When the medium 10 moves (rotates) in the direction of an arrow X, a high temperature region 22 whose temperature is $T_{sw}2$ or higher shifts rightward with respect to the central point of the readout light spot 25. Thus, a low temperature region 23 whose temperature is lower than $T_{sw}2$ is obtained as a crescent portion in the left side of the readout light spot 25.

Assuming that a critical temperature at which the readout magnetic film 13 shifts from an in-plane magneto-anisotropy film to a perpendicular magneto-anisotropy film is $T_{sw}1$ and the environmental temperature (room temperature) of the medium 10 during operation is $T_{sw}0$, the respective temperatures have the relationship: $T_{sw}0<T_{sw}1<T_{sw}2$. The Curie temperature $T_c$ of the recording magnetic film 15 of the medium 10 is set at about 250° C. for the purpose of stably maintaining the thermo-magnetically recorded domain 24.

The control magnetic film 14 can be formed from an alloy of a rare earth metal and a transition metal. As in-plane magneto-anisotropy in the control magnetic film 14 is larger, the exchange-coupled force between the readout magnetic film 13 and the recording magnetic film 15 can be controlled more satisfactorily. Thus, examples of the material for the control magnetic film 14 include GdFeCo, GdFe, and GdCo.

In the case where the control magnetic film 14 is made of GdCo, however, the control magnetic film 14 does not usually shift from an in-plane magneto-anisotropy film to a perpendicular magneto-anisotropy film. Nevertheless, in the case where the control magnetic film 14 is made of GdFe, although the control magnetic film 14 shifts from an in-plane magneto-anisotropy film to a perpendicular magneto-anisotropy film, it is difficult to allow the control magnetic film 14 to assume a perpendicular magneto-anisotropy film in a wide temperature range and thus to sufficiently exhibit its function.

Considering the above, in order to control the compensation temperature of the control magnetic film 14 and the temperature at which the control magnetic film 14 shifts from an in-plane magneto-anisotropy film to a perpendicular magneto-anisotropy film, GdFeCo is suitable as a material for the control magnetic film 14 because its composition can be set in a wide range.

A GdFeCo film as the control magnetic film 14 can be produced, for example, as follows.

The compensation temperature $T_{comp}$ of the control magnetic film 14 is substantially determined by the proportion of Gd. For example, in the case where the proportion of Gd is 20 to 28%, the compensation temperature $T_{comp}$ is 50° to 280° C. The temperature at which the control magnetic film 14 shifts from an in-plane magneto-anisotropy film to a perpendicular magneto-anisotropy film is determined by the ratio of Fe to Co, i.e., Fe/Co ratio. As the Fe/Co ratio is smaller, the control magnetic film 14 assumes a perpendicular magneto-anisotropy film at higher temperatures.

In order to satisfy the relationship $T_{sw}1<T_{sw}2$, the following conditions are required.

When a disk drive is operated for the purpose of reading out information from the magneto-optical recording medium, the temperature in a device tends to increase to about 50° C., taking the fluctuation of the environmental temperature Into consideration. In order to ensure the power required for reading out information even under the condition that the device's temperature has increased, $T_{sw}1$ is desirably at least 80° C., and $T_{sw}2$ is desirably at least 100° C. On the other hand, when $T_{sw}2$ increases to a temperature higher than the Curie temperature $T_c$ of the recording magnetic film 15, the domains of the recording magnetic film 15 are destroyed during readout. Thus, the relationship $T_{sw}2<T_c$ has to be satisfied. In general, the Curie temperature $T_c$ of the recording magnetic film 15 is set in accordance with recording sensitivity which allows a semiconductor laser to record information on the recording magnetic film 15. The Curie temperature $T_c$ of the recording magnetic film 15 is desirably in the range of 200° to 300° C.

Considering the above, it was found that $T_{sw}2$ is desirably in the range of 100° to 250° C., and the proportion of Gd required for ensuring this range was found to be in the range of 23 to 28%.

In order to improve the quality of a readout signal, it is desired that $T_{sw}2$ is set as high as possible in an allowable temperature range. Specifically, $T_{sw}2$ is desirably in the range of 170° to 250° C., and in order to ensure this range, the proportion of Gd is preferably in the range of 25 to 27%.

In the medium 10 exhibiting the characteristic shown in FIG. 3(a), $T_{sw}1$ of the readout magnetic film 13 is set at about 100° C., the proportion of Gd of the control magnetic film 14 at about 26.7%, the compensation temperature $T_{comp}$ at about 240° C., the Fe/Co ratio at about 56%, and $T_{sw}2$ at about 150° C.

As shown in FIG. 3(a), the coercive force of the control magnetic film 14 increases with an increase in temperature. The control magnetic film 14 functions as an in-plane magneto-anisotropy film in the region 20 (corresponding to the low temperature region 23 in FIG. 3(b)) whose temperature is lower than $T_{sw}2$, and functions as a perpendicular magneto-anisotropy film in the region 21 (corresponding to the high temperature region 22 in FIG. 3(b)) whose temperature is $T_{sw}2$ or higher.

During readout, the temperature distribution as shown in FIG. 3(b) is formed in a region where a readout laser beam is irradiated, so that, within the readout light spot 25, there exist the low temperature region 23, whose temperature is lower than $T_{sw}2$, and the high temperature region 22, whose temperature is $T_{sw}2$ or higher. At this time, the control magnetic film 14 assumes an in-plane magneto-anisotropy film in the low temperature region 23 whose temperature is lower than $T_{sw}2$, so that there exists no exchange-coupled force between the readout magnetic film 13 and the recording magnetic film 15 in that region 23. The control magnetic film 14 assumes a perpendicular magneto-anisotropy film only in the high temperature region 22 whose temperature is $T_{sw}2$ or higher, and therefore, the exchange-coupled force between the readout magnetic film 13 and the recording magnetic film 15 works only in the high temperature region 22 through the control magnetic film 14. Thus, a readout signal can be read out only in the high temperature region 22 within the readout light spot 25 whose temperature is $T_{sw}2$ or higher. Furthermore, the readout magnetic film 13 assumes an in-plane magneto-anisotropy film in portions whose temperature is other than the readout temperature; therefore, information of the recording magnetic film 15 is not copied onto the readout magnetic film 13. Thus, the initialization magnetic field is not required to be impressed.

Hereinafter, the readout operation of the medium 10 will be described with reference to FIGS. 4(a) and 4(b).

Figure 4A:
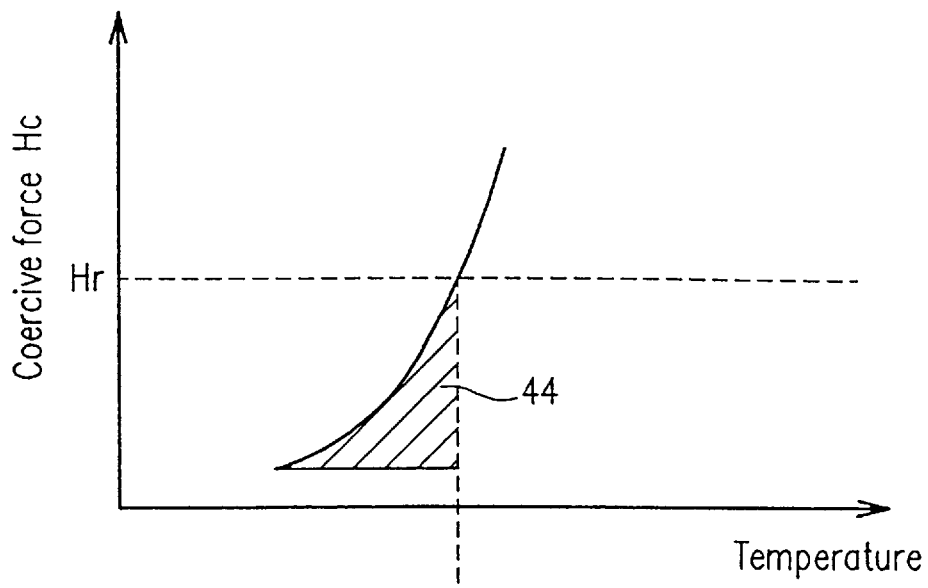
FIG. 4(a) is a graph showing temperature dependence of a coercive force in a control magnetic film of the magneto-optical recording medium in Embodiment 1 of the present invention.

FIG. 4(a) is a graph showing the change in coercive force of the control magnetic film 14 with respect to the temperature. In this figure, the horizontal axis represents the temperature and the perpendicular axis represents the intensity of a coercive force Hc. FIG. 4(b) schematically shows magnetized states of the readout magnetic film 13, the control magnetic film 14, and the recording magnetic film 15 which are layered as a recording layer structure.

As described above, the control magnetic film 14 assumes an in-plane magneto-anisotropy film in a region whose temperature is lower than $T_{sw}2$ and assumes a perpendicular magneto-anisotropy film in a region whose temperature is $T_{sw}2$ or higher. During readout, the irradiation of a laser beam onto the medium 10 causes the temperature of the control magnetic film 14 to increase. This allows the control magnetic film 14 to shift from an in-plane magneto-anisotropy film to a perpendicular magneto-anisotropy film, and the exchange-coupled force works between the readout magnetic film 13 and the recording magnetic film 15. Simultaneously with this, the magnetized direction of the recording magnetic film 15 is aligned with that of the readout magnetic film 13, whereby information recorded on the recording magnetic film 15 is copied onto the readout magnetic film 13. Then, the recorded information can be read out as an optical signal by the magneto-optical effect that a polarization plane of reflected readout light rotates in accordance with the magnetized direction of the readout magnetic film 13.

Figure 4B:
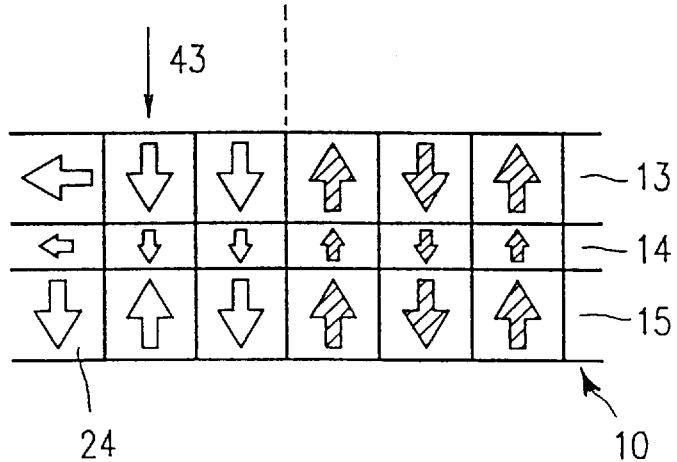
FIG. 4(b) is a view schematically showing a magnetized direction in each magnetic film.

At this time, as represented by an arrow 43 of FIG. 4(b), the readout magnetic field 43 is preferably impressed to the medium 10. Assuming that the exchange-coupled force between the readout magnetic film 13 and the recording magnetic film 15 is Hc, a region 44 shown in FIG. 4(a) is the one where the sum of a coercive force Hp of the readout magnetic film 13 and the exchange-coupled force Hc is smaller than a readout magnetic field Hr, namely, where the relationship Hr>Hc+Hp is satisfied. By impressing the readout magnetic field 43 to the medium 10, the magnetized direction of the readout magnetic film 13 can be forcibly aligned with the direction of the readout magnetic field 43 in the region 44 where the relationship Hr>Hc+Hp is satisfied. By doing so, the information recorded on the recording magnetic film 15 is copied onto the corresponding domain of the recording magnetic film 13, and information of the domain smaller than the readout light spot can be read out.

Embodiment 2

Next, a magneto-optical recording medium 20 in Embodiment 2 of the present invention will be described.

The structure of the medium 20 is basically the same as that of the medium 10 in Embodiment 1 described with reference to FIG. 1; therefore, the description thereof is omitted here.

Figure 5A:
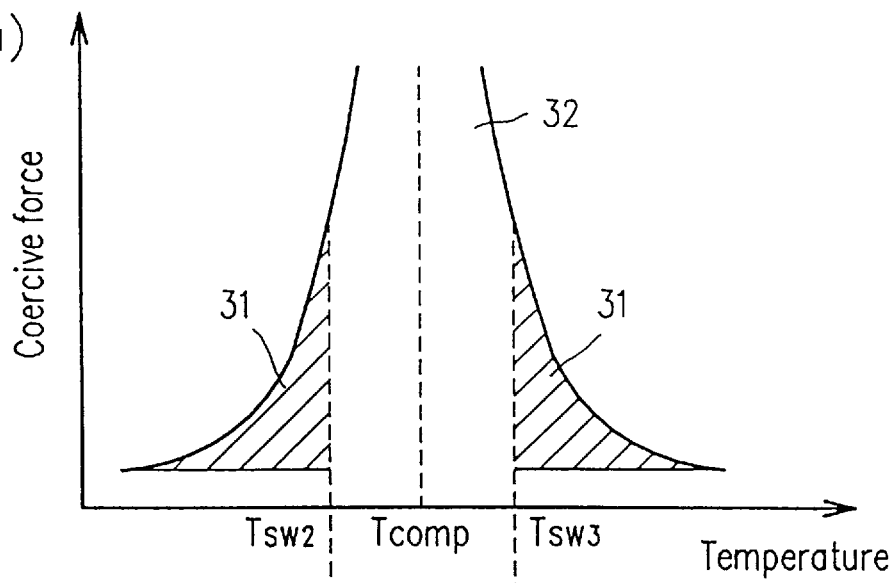
FIG. 5(a) is a graph showing temperature dependence of a coercive force in a control magnetic film of the magneto-optical recording medium in Embodiment 2 of the present invention.
Figure 5B:
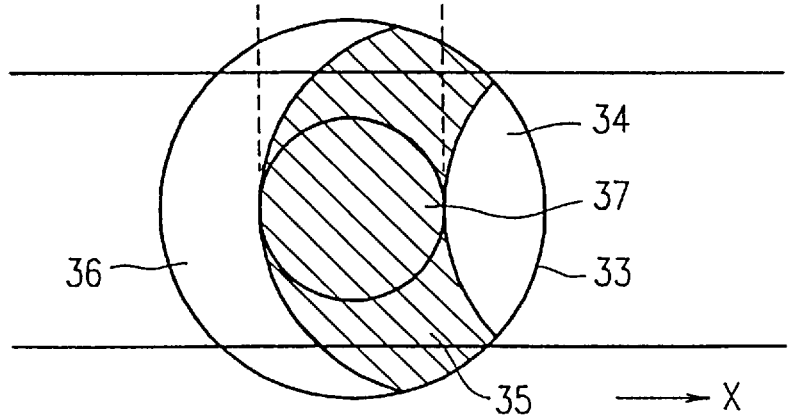
FIG. 5(b) is a view showing a temperature distribution of a readout light spot along a track of the magneto-optical recording medium in Embodiment 2 of the present invention.

FIG. 5(a) is a graph showing a temperature characteristic of a coercive force of a control magnetic film 14 in the medium 20. FIG. 5(b) is a partial upper face view of the medium 20, showing the vicinity of a readout light spot 33 with respect to a track.

In FIG. 5(a), a horizontal axis represents temperatures in the range from room temperature to $T_{sw}2$, a compensation temperature $T_{comp}$, and further to $T_{sw}3$ or higher. FIG. 5(b) shows a temperature distribution formed by heating the control magnetic film 14 when a laser beam is irradiated on a track of the medium 20 to form the readout light spot 33. The control magnetic film 14 in the magneto-optical recording medium 20 assumes an in-plane magneto-anisotropy film in a low temperature region 36 whose temperature is lower than a critical temperature $T_{sw}2$, and assumes a perpendicular magneto-anisotropy film in an intermediate temperature region 35 whose temperature is the critical temperature $T_{sw}2$ or higher and lower than $T_{sw}3$. Furthermore, in a high temperature region 34 whose temperature is $T_{sw}3$ or higher, the control magnetic film 14 assumes an in-plane magneto-anisotropy film.

In FIG. 5(b), when a laser beam is irradiated on the rotating medium 20 in the same way as in the conventional example to form the readout light spot 33 on the medium 20, a temperature distribution of a readout magnetic film 13 and the control magnetic film 14 shifts toward the moving direction of the medium 20 (the direction of the arrow X) with respect to a central point of the readout light spot 33.

Here, it is assumed that a domain 37 is present at the central portion of the readout light spot 33. When the medium 20 moves (rotates) in the direction of an arrow X, the intermediate temperature region 35, whose temperature is $T_{sw}2$ or higher, shifts rightward with respect to the central point of the readout light spot 33. Thus, a low temperature region 36, whose temperature is lower than $T_{sw}2$, is obtained as a crescent portion in the left side of the readout light spot 33. In addition, the high temperature region 34 whose temperature is $T_{sw}3$ or higher is formed in the right side of the readout light spot 33.

Assuming that a temperature at which the readout magnetic film 13 shifts from an in-plane magneto-anisotropy film to a perpendicular magneto-anisotropy film is $T_{sw}1$, a temperature at which the control magnetic film 14 shifts from an in-plane magneto-anisotropy film to a perpendicular magneto-anisotropy film $T_{sw}2$, and a temperature at which the control magnetic film 14 re-shifts from a perpendicular magneto-anisotropy film to an in-plane magneto-anisotropy film $T_{sw}3$, respectively, the respective temperatures have the relationship: $T_{sw}1<T_{sw}2<T_{sw}3$. As shown in FIG. 5(a), the coercive force of the control magnetic film 14 increases with an increase in temperature; however, it decreases again at a temperature exceeding the compensation temperature $T_{comp}$.

When information is read out from the magneto-optical recording medium, a temperature distribution as shown in FIG. 5(b) is formed in a region where a readout laser beam is irradiated. Within the readout light spot 33, there exist the high temperature region 34, whose temperature is $T_{sw}3$ or higher, and the low temperature region 36, whose temperature is lower than $T_{sw}2$ (both corresponding to the region 31 shown in FIG. 5(a)), and further the intermediate temperature region 35 (corresponding to the region 32 shown in FIG. 5(a)) whose temperature is $T_{sw}2$ or higher and lower than $T_{sw}3$. By selecting the composition of the control magnetic film 14 so that it assumes an in-plane magneto-anisotropy film in the high temperature region 34 and the low temperature region 36, the control magnetic film 14 assumes a perpendicular magneto-anisotropy film in the intermediate temperature region 35 whose temperature is $T_{sw}2$ or higher and lower than $T_{sw}3$. Thus, the exchange-coupled force between the recording magnetic film 15 and the readout magnetic film 13 strongly works only in the intermediate temperature region 35 through the control magnetic film 14. In the regions other than the intermediate temperature region 35, even when the readout magnetic film 13 assumes a perpendicular magneto-anisotropy film, the exchange-coupled force is not worked between the readout magnetic film 13 and the recording magnetic film 15 because the control magnetic film 14 assumes an in-plane magneto-anisotropy film. As a result, a recorded signal is read out from only a part of the readout light spot 33.

When the control magnetic film 14 is prepared of $Gd_{24.7}Fe_{41.4}Co_{33.9}$, the compensation temperature $T_{comp}$ is about 160° C., $T_{sw}2$ at which the control magnetic film 14 shifts from an in-plane magneto-anisotropy film to a perpendicular magneto-anisotropy film is about 130° C., and $T_{sw}3$ at which the control magnetic film 14 re-shifts from a perpendicular magneto-anisotropy film to an in-plane magneto-anisotropy film is about 190° C.

Hereinafter, the readout operation of the medium 20 will be described with reference to FIGS. 6(a) and 6(b).

Figure 6A:
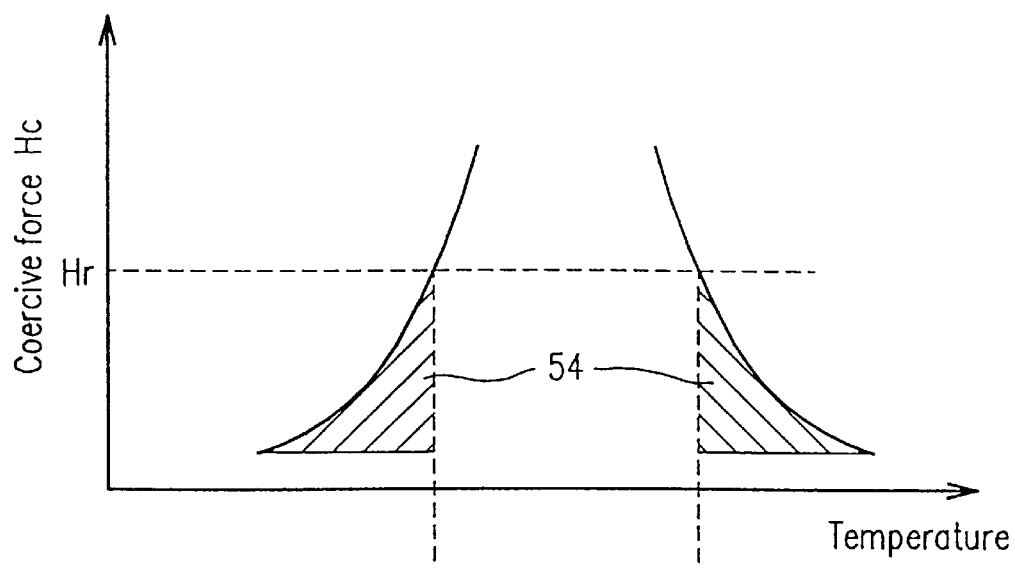
FIG. 6(a) is a graph showing temperature dependence of a coercive force in a control magnetic film of the magneto-optical recording medium in Embodiment 2 of the present invention.

FIG. 6(a) is a graph showing the change in coercive force with respect to the temperature of the control magnetic film 14. In this figure, the horizontal axis represents the temperature and the perpendicular axis represents the intensity of a coercive force Hc. FIG. 6(b) schematically shows magnetized states of the readout magnetic film 13, the control magnetic film 14, and the recording magnetic film 15, which are layered as a recording layer structure.

As described above, the control magnetic film 14: assumes an in-plane magneto-anisotropy film in the low temperature region whose temperature is lower than $T_{sw}2$, assumes a perpendicular magneto-anisotropy film in the intermediate temperature region whose temperature is $T_{sw}2$ or higher and lower than $T_{sw}3$, and assumes an in-plane magneto-anisotropy film in the high temperature region whose temperature is $T_{sw}3$ or higher. During readout, the irradiation of a laser beam onto the medium 20 causes the temperature of the control magnetic film 14 to increase. This allows the control magnetic film 14 to shift from an in-plane magneto-anisotropy film to a perpendicular magneto-anisotropy film, and the exchange-coupled force works between the readout magnetic film 13 and the recording magnetic film 15. Simultaneously with this, the magnetized direction of the recording magnetic film 15 is aligned with that of the readout magnetic film 13, whereby information recorded on the recording magnetic film 15 is copied onto the readout magnetic film 13. Then, the recorded information can be read out as an optical signal by the magneto-optical effect that a polarization plane of reflected readout light rotates in accordance with the magnetized direction of the readout magnetic film 13.

Figure 6B:
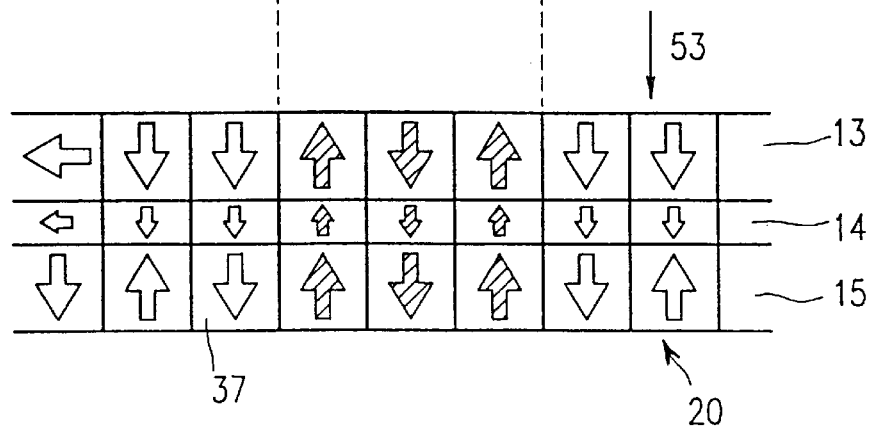
FIG. 6(b) is a view schematically showing a magnetized direction in each magnetic film.

At this time, as represented by an arrow 53 of FIG. 6(b), the readout magnetic field 53 is preferably impressed to the medium 20. Assuming that the exchange-coupled force between the readout magnetic film 13 and the recording magnetic film 15 is Hc, a region 54 shown in FIG. 6(a) is the one where the sum of a coercive force Hp of the readout magnetic film 13 and the exchange-coupled force Hc is smaller than a readout magnetic field Hr, namely, where the relationship Hr>Hc+Hp is satisfied. By impressing the readout magnetic field 53 to the medium 20, the magnetized direction of the readout magnetic film 13 can be forcibly aligned with the direction of the readout magnetic field 53 in the region 54 where the relationship Hr>Hc+Hp is satisfied. By doing so, the information recorded on the recording magnetic film 15 is copied onto the corresponding domain of the readout magnetic film 13, and information of the domain smaller than the readout light spot can be read out.

Embodiment 3

Next, a magneto-optical recording medium 30 in Embodiment 3 of the present invention will be described.

The structure of the medium 30 is basically the same as that of the medium 10 in Embodiment 1 described with reference to FIG. 1; therefore, the description thereof is omitted here.

Figure 7A:
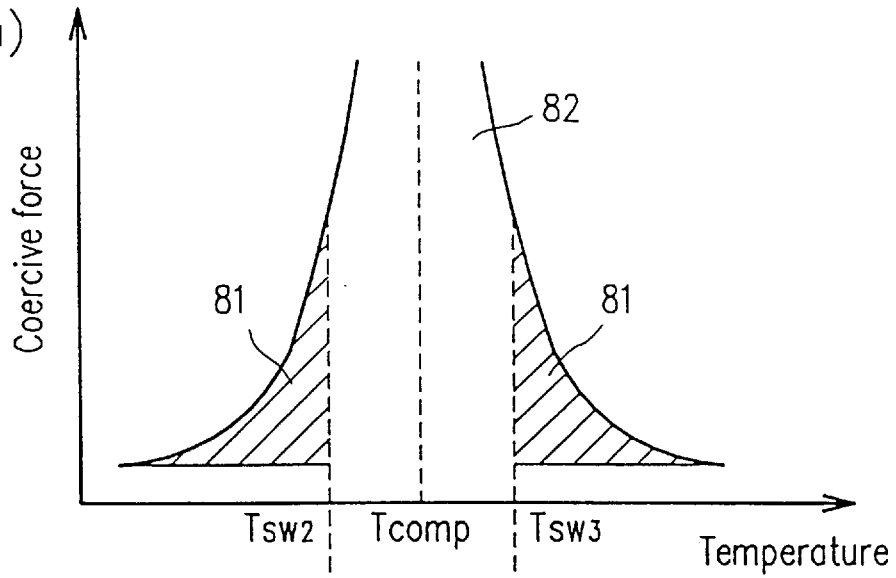
FIG. 7(a) is a graph showing temperature dependence of a coercive force in a control magnetic film of the magneto-optical recording medium in Embodiment 3 of the present invention.
Figure 7B:
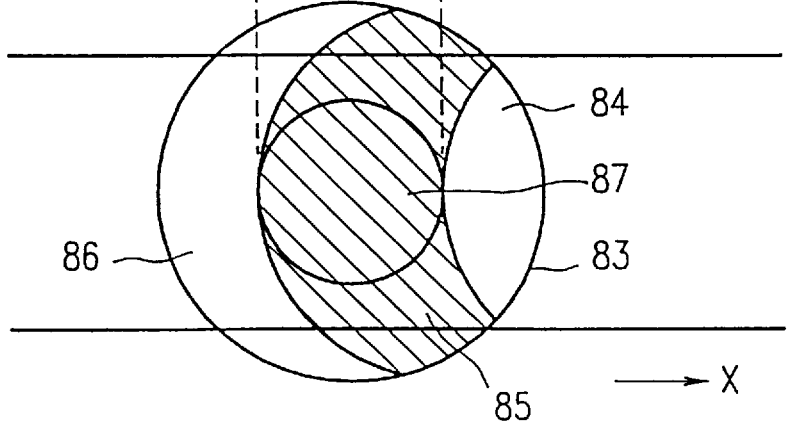
FIG. 7(b) is a view showing a temperature distribution of a readout light spot along a track of the magneto-optical recording medium in Embodiment 3 of the present invention.

FIG. 7(a) is a graph showing a temperature characteristic of a coercive force of a control magnetic film 14 in the medium 30. FIG. 7(b) is a partial upper face view of the medium 30, showing the vicinity of a readout light spot 83 with respect to a track.

In FIG. 7(a), a horizontal axis represents temperatures in the range from room temperature to $T_{sw}2$, a compensation temperature $T_{comp}$, and further to $T_{sw}3$ or higher. FIG. 7(b) shows a temperature distribution formed by heating the control magnetic film 14 when a laser beam is irradiated on a track of the medium 30 to form the readout light spot 83.

The control magnetic film 14 in the magneto-optical recording medium 30 assumes a perpendicular magneto-anisotropy film at a temperature in the range of room temperature to Curie temperature $T_c$. The control magnetic film 14 assumes an in-plane magneto-anisotropy film in a low temperature region 86 whose temperature is lower than a critical temperature $T_{sw}2$, and assumes a perpendicular magneto-anisotropy film in an intermediate temperature region 85 whose temperature is the critical temperature $T_{sw}2$ or higher and lower than $T_{sw}3$. Furthermore, in a high temperature region 84 whose temperature is $T_{sw}3$ or higher, the control magnetic film 14 assumes an in-plane magneto-anisotropy film.

In FIG. 7(b), when a laser beam is irradiated on the rotating medium 30 in the same way as in the conventional example to form the readout light spot 83 on the medium 30, a temperature distribution of a readout magnetic film 13 and the control magnetic film 14 shifts toward the moving direction (i.e., the direction of an arrow X) of the medium 30 with respect to a central point of the readout light spot 83.

Here, it is assumed that a domain 87 is present at the central portion of the readout light spot 83. When the medium 30 moves (rotates) in the direction of the arrow X, the intermediate temperature region 85 whose temperature is $T_{sw}2$ or higher and lower than $T_{sw}3$ shifts rightward with respect to the central point of the readout light spot 83. Thus, a low temperature region 86 whose temperature is lower than $T_{sw}2$ is obtained as a crescent portion in the left side of the readout light spot 83. In addition, the high temperature region 84 whose temperature is $T_{sw}3$ or higher is formed in the right side of the readout light spot 83.

Assuming that Curie temperature of the readout magnetic film 13 is $T_c$, a temperature at which the control magnetic film 14 shifts from an in-plane magneto-anisotropy film to a perpendicular magneto-anisotropy film is $T_{sw}2$, and a temperature at which the control magnetic film 14 re-shifts from a perpendicular magneto-anisotropy film to an in-plane magneto-anisotropy film is $T_{sw}3$, respectively, the respective temperatures have the relationship: $T_{sw}2<T_{sw}3<T_c$. As shown in FIG. 7(a), the coercive force of the control magnetic film 14 increases with an increase in temperature; however, it decreases again at a temperature exceeding the compensation temperature $T_{comp}$.

When information is read out from the magneto-optical recording medium, a temperature distribution as shown in FIG. 7(b) is formed in a region where a readout laser beam is irradiated. Within the readout light spot 83, there exist the high temperature region 84 whose temperature is $T_{sw}3$ or higher and the low temperature region 86 whose temperature is lower than $T_{sw}2$ (both corresponding to the region 81 in FIG. 7(a)), and further the intermediate temperature region 85 (corresponding to the region 82 in FIG. 7(a)). By selecting the composition of the control magnetic film 14 so that it assumes an in-plane magneto-anisotropy film in the high temperature region 84 and the low temperature region 86, the control magnetic film 14 assumes a perpendicular magneto-anisotropy film in the intermediate temperature region 85 whose temperature is $T_{sw}2$ or higher and lower than $T_{sw}3$. Thus, the exchange-coupled force between the recording magnetic film 15 and the readout magnetic film 13 strongly works only in the intermediate temperature region 85 through the control magnetic film 14. In the regions other than the intermediate temperature region 85, although the readout magnetic film 13 assumes a perpendicular magneto-anisotropy film, the exchange-coupled force is not worked between the readout magnetic film 13 and the recording magnetic film 15 because the control magnetic film 14 assumes an in-plane magneto-anisotropy film. As a result, a recorded signal is read out from only a part of the readout light spot 83.

When the control magnetic film 14 is prepared of $Gd_{24.7}Fe_{41.4}Co_{33.9}$, the compensation temperature $T_{comp}$ is about 160° C., $T_{sw}2$ at which the control magnetic film 14 shifts from an in-plane magneto-anisotropy film to a perpendicular magneto-anisotropy film is about 130° C., and $T_{sw}3$ at which the control magnetic film 14 re-shifts from a perpendicular magneto-anisotropy film to an in-plane magneto-anisotropy film is about 190° C.

Hereinafter, the readout operation of the medium 30 will be described with reference to FIGS. 8(a) and 8(b).

Figure 8A:
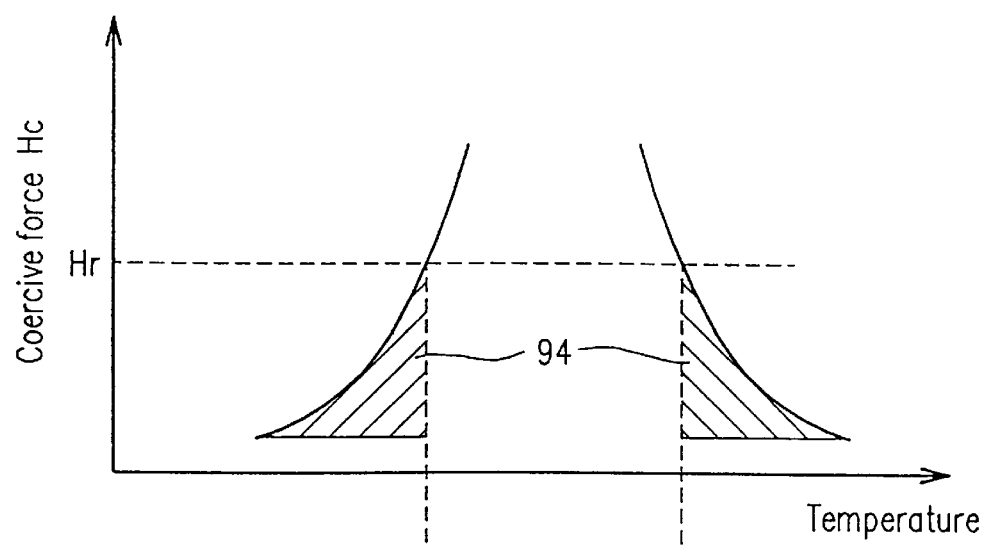
FIG. 8(a) is a graph showing temperature dependence of a coercive force in a control magnetic film of the magneto-optical recording medium in Embodiment 3 of the present invention.

FIG. 8(a) is a graph showing the change in coercive force with respect to the temperature of the control magnetic film 14. In this figure, the horizontal axis represents the temperature and the perpendicular axis represents the intensity of a coercive force Hc. FIG. 8(b) schematically shows magnetized states of the readout magnetic film 13, the control magnetic film 14, and the recording magnetic film 15, which are layered as a recording layer structure.

As described above, the control magnetic film 14: assumes an in-plane magneto-anisotropy film in the low temperature region whose temperature is lower than $T_{sw}2$, assumes a perpendicular magneto-anisotropy film in the intermediate temperature region whose temperature is $T_{sw}2$ or higher and lower than $T_{sw}3$, and assumes an in-plane magneto-anisotropy film in the high temperature region whose temperature is $T_{sw}3$ or higher. During readout, the irradiation of a laser beam onto the medium 30 causes the temperature of the control magnetic film 14 to increase. This allows the control magnetic film 14 to shift from an in-plane magneto-anisotropy film to a perpendicular magneto-anisotropy film, and the exchange-coupled force works between the readout magnetic film 13 and the recording magnetic film 15. Simultaneously with this, the magnetized direction of the recording magnetic film 15 is aligned with that of the readout magnetic film 13, whereby information recorded on the recording magnetic film 15 is copied onto the readout magnetic film 13. Then, the recorded information can be read out as an optical signal by the magneto-optical effect that a polarization plane of reflected readout light rotates in accordance with the magnetized direction of the readout magnetic film 13.

Figure 8B:
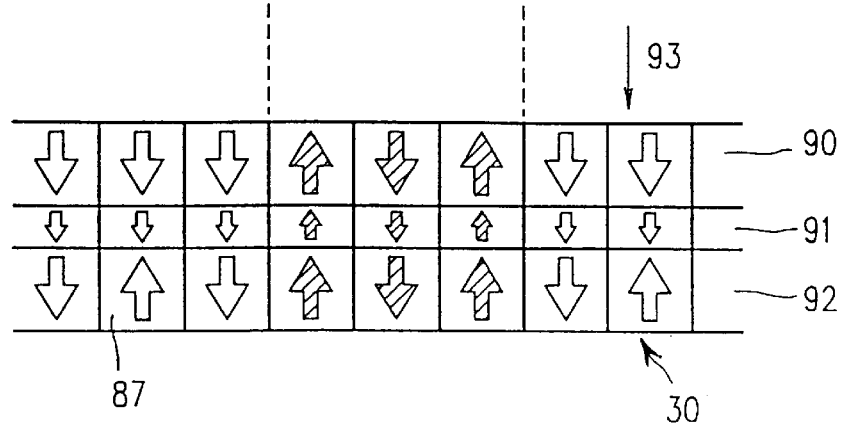
FIG. 8(b) is a view schematically showing a magnetized direction in each magnetic film.
Figure 9A:
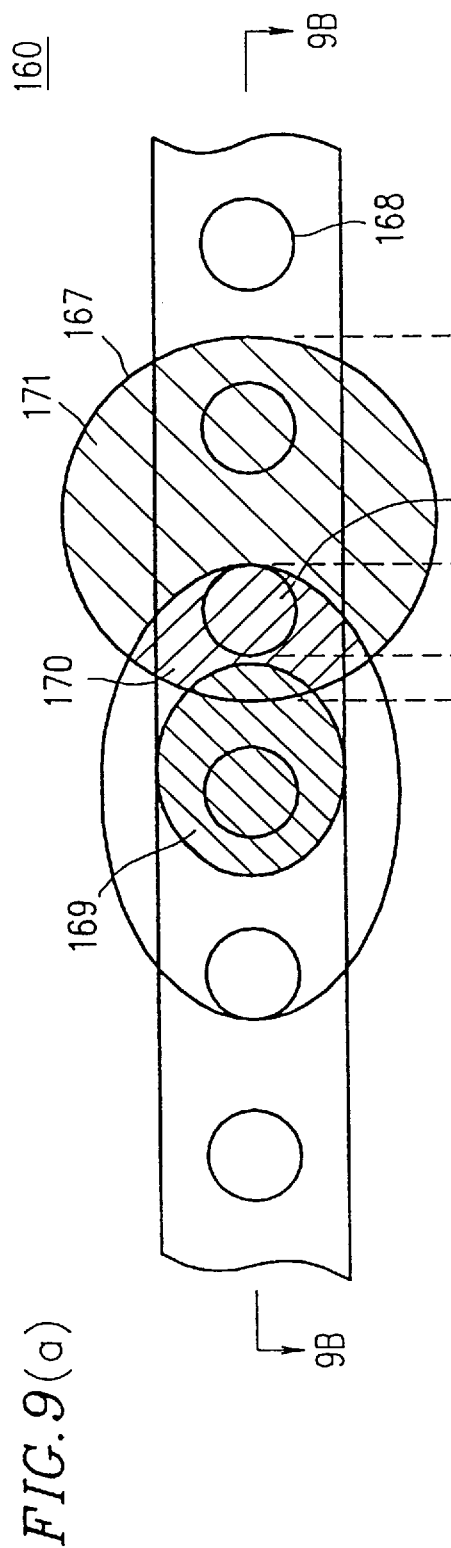
FIG. 9(a) is a graph showing temperature dependence of a coercive force in a control magnetic film of a conventional magneto-optical recording medium.
Figure 9B:
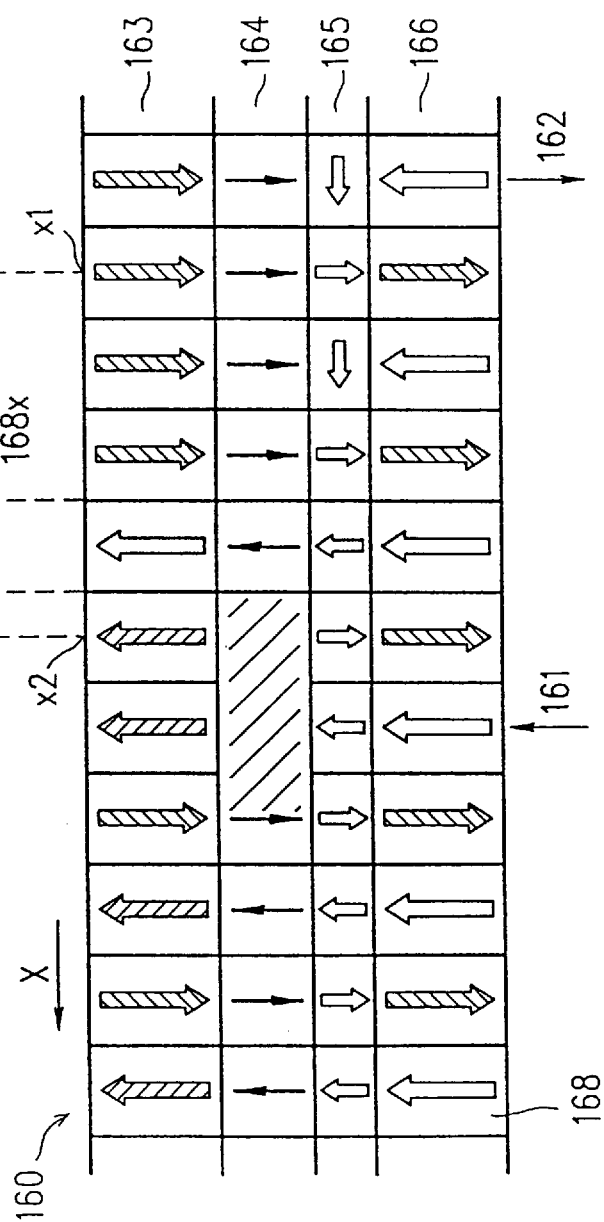
FIG. 9(b) is a view schematically showing a magnetized direction in each magnetic film.
Figures 10A, 10B:
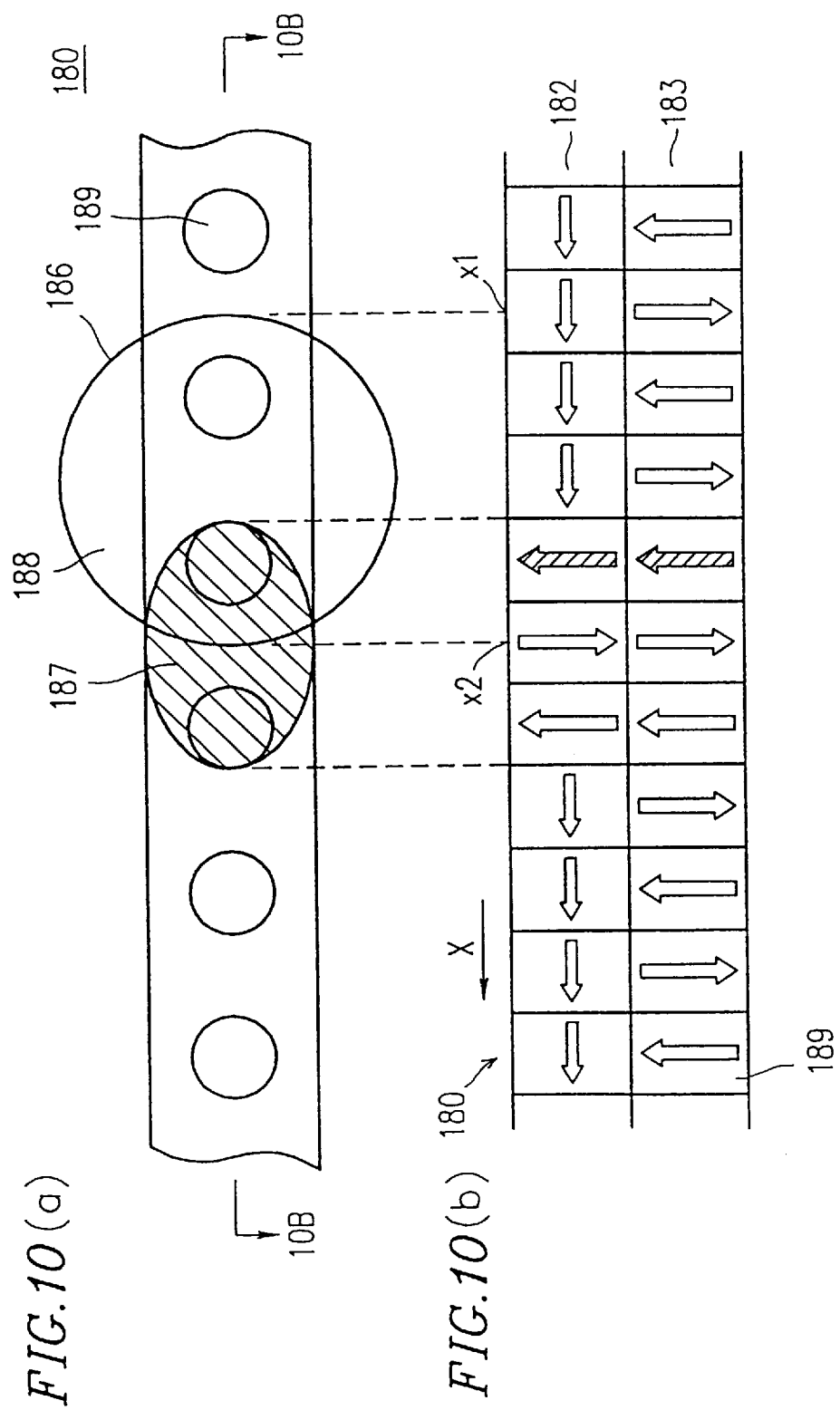
FIG. 10(a) is a graph showing temperature dependence of a coercive force in a control magnetic film of another conventional magneto-optical recording medium.
FIG. 10(b) is a view schematically showing a magnetized direction in each magnetic film.

At this time, as represented by an arrow 93 of FIG. 8(b), the readout magnetic field 93 is preferably impressed to the medium 30. Assuming that the exchange-coupled force between the readout magnetic film 13 and the recording magnetic film 15 is Hc, a region 94 shown in FIG. 8(a) is the one where the sum of a coercive force Hp of the readout magnetic film 13 and the exchange-coupled force Hc is smaller than a readout magnetic field Hr, namely, where the relationship Hr>Hc+Hp is satisfied. By impressing the readout magnetic field 93 to the medium 30, the magnetized direction of the readout magnetic film 13 can be forcibly aligned with the direction of the readout magnetic field 93 in the region 94 where the relationship Hr>Hc+Hp is satisfied. By doing so, the information recorded on the recording magnetic film 15 is copied onto the corresponding domain of the readout magnetic film 13, and information of the domain smaller than the readout light spot can be read out.

In the magneto-optical recording media in each embodiment as described above, a ZnS film is used as the first protection film 12 and the second protection film 16. Alternatively, films of other chalcogens, those of oxides such as $TaO_2$, those of nitrides such as SiN, or those of compounds thereof can be used.

Although a GdFeCo film and a TbFeCo film are used as the readout magnetic film 13 and the recording magnetic film 15, respectively, in the above description, films made of compounds of rare earth metal and transition metal type ferrimagnetic materials, Mn type magnetic films such as a MnBiAl film, or other magnetic materials can be used as each magnetic film. Furthermore, as the readout magnetic film, those which always assume a perpendicular magneto-anisotropy film at a temperature lower than the Curie temperature $T_c$ can be used.

Furthermore, although an epoxyacrylate type resin is used as the protection layer 17, two plates each having a layered structure of the respective magnetic films but not having a protection layer 17 can be attached to each other with a urethane type resin or a hotmelt adhesive to form a magneto-optical recording medium without forming the protection layer 17.

In the magneto-optical recording medium of the present invention having the above-mentioned characteristics, the readout magnetic film functions as an in-plane magneto-anisotropy film at a temperature lower than $T_{sw}1$ and shifts to a perpendicular magneto-anisotropy film at $T_{sw}1$ or higher. On the other hand, the control magnetic film functions as an in-plane magneto-anisotropy film at a temperature lower than $T_{sw}2$ and shifts to a perpendicular magneto-anisotropy film at $T_{sw}2$ or more. Each of the temperatures $T_{sw}1$ and $T_{sw}2$ is higher than room temperature. The above aspects are realized by appropriately setting the structure of each magnetic film. Furthermore, the structure of the control magnetic film and the readout magnetic film are set so that the relationship $T_{sw}1 < T_{sw}2$ is satisfied.

Thus, in a temperature region lower than $T_{sw}2$, the control magnetic film present between the recording magnetic film and the readout magnetic film functions as an in-plane magneto-anisotropy film. This suppresses the shift of the readout magnetic film from an in-plane magneto-anisotropy film to a perpendicular magneto-anisotropy film caused by the exchange-coupled force from the recording magnetic film. This restricts regions where the domains of the recording magnetic film are copied onto the readout magnetic film through the control magnetic film during readout; thus, a magneto-optical recording medium having high readout resolution can be obtained.

According to the method for reading out information from the magneto-optical recording medium of the present invention, domains are first formed in the recording magnetic film by thermo-magnetic recording. During readout, a laser beam as readout light is irradiated on the medium, the temperature of each magnetic film included in the recording layer structure is raised. Specifically, the magnetized direction of the readout magnetic film is shifted from an in-plane direction to a perpendicular direction, and then the control magnetic film is shifted from the in-plane magneto-anisotropy film to the perpendicular magneto-anisotropy film. Because of the change in magnetic characteristics of the control magnetic film, magnetic coupling is worked between the readout magnetic film and the recording magnetic film, whereby the magnetized direction of the domains of the recording magnetic film is copied onto the readout magnetic film. Then, the recorded information is read out as an optical signal due to the magneto-optical effect that the polarization plane of reflected readout light rotates in accordance with the magnetized direction of the readout magnetic film.

In the above-mentioned readout operation, there exists a temperature distribution in a beam spot formed by the irradiated readout laser beam, i.e., a readout light spot. Since the control magnetic film assumes a perpendicular magneto-anisotropy film only in a region whose temperature is $T_{sw}2$ or more, the domains in a region whose temperature is less than $T_{sw}2$ in the readout light spot is masked. Consequently, information recorded on domains smaller than the readout light spot can be read out.

Furthermore, when the structure of the control magnetic film is set so that the control magnetic film assumes an in-plane magneto-anisotropy film in a region whose temperature is $T_{sw}3$ or more which is higher than $T_{sw}2$, a region whose temperature is $T_{sw}3$ or more within the readout light spot is also masked. Thus, information recorded on a further smaller range can be read out.

As described above, in the magneto-optical recording medium of the present invention, only a predetermined region of the control magnetic film is shifted from an in-plane magneto-anisotropy film to a perpendicular magneto-anisotropy film during readout, and an exchange-coupled force is allowed to work between the recording magnetic film and the readout magnetic film only in that region. Consequently, even when a readout power changes, the size of a region where domains in the recording magnetic film are copied onto the readout magnetic film does not change, whereby the deterioration of the readout characteristics caused by the interaction from the adjacent domains can be suppressed.

During readout, the readout magnetic field Hr may be impressed to the magneto-optical recording medium of the present invention. In this case, in a region in which the relationship Hr>Hc+Hp is satisfied, where Hc represents an exchange-coupled force between the readout magnetic film and the recording magnetic film and Hp represents a coercive force of the readout magnetic film, the control magnetic film assumes a perpendicular magneto-anisotropy film. Thus, even when the exchange-coupled force between the readout magnetic film and the control magnetic film is allowed to work, the magnetized direction of the readout magnetic film is directed to the readout magnetic field. Therefore, a region of the readout magnetic film whose magnetized direction is aligned with that of the domains of the recording magnetic film is further defined. As a result, a region where the recorded information is read out through the copying of the magnetized direction of the domains is further narrowed, and a magneto-optical recording medium capable of higher density recording can be produced.

According to the method for reading out information from the magneto-optical recording medium of the present invention, each magnetic film is irradiated with a laser beam so as to be heated during readout, whereby only a predetermined region of the control magnetic film affected by the heating temperature is shifted from an in-plane magneto-anisotropy film to a perpendicular magneto-anisotropy film. In this case, only in a region where the control magnetic film assumes a perpendicular magneto-anisotropy film, an exchange-coupled force between the readout magnetic film and the recording magnetic film is allowed to work. Thus, information can be read out from particular domains in the recording magnetic film while the domains in the vicinity thereof are masked. This enables recorded information to be read out accurately and stably even when the size of a domain is smaller than that of the readout light spot; that is, an super-resolution effect can be realized, resulting in the improvement in recording and readout density of information. As a result, much more information can be recorded on and read out from the magneto-optical recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optical recording medium comprising a substrate, and a recording layer structure including at least a readout magnetic film, a control magnetic film, and a recording magnetic film formed on the substrate, wherein the recording magnetic film is a perpendicular magneto-anisotropy film which is magnetized by being irradiated with recording light so as to be heated and by being impressed with a recording magnetic field, on which information to be recorded is recorded and stored in the form of a magnetized direction of a domain, the readout magnetic film is a perpendicular magneto-anisotropy film at a temperature in a predetermined range, and readout light is irradiated on the recording layer structure so that the magnetized direction of the domain of the recording magnetic film is copied onto the readout magnetic film to read out the recorded information, the control magnetic film is provided between the readout magnetic film and the recording magnetic film so as to control working of an exchange-coupled force between the readout magnetic film and the recording magnetic film, the control magnetic-film being a perpendicular magneto-anisotropy film at a temperature in a predetermined range and an in-plane magneto-anisotropy film at a temperature in a range other than the predetermined range, and information recorded on the recording magnetic film is copied onto the readout magnetic film through the control magnetic film by the exchange-coupled force in a region of the recording layer structure having a temperature at which the readout magnetic film and the control magnetic film are both perpendicular magneto-anisotropy films.

2. A magneto-optical recording medium according to claim 1, wherein the readout magnetic film is an in-plane magneto-anisotropy film at a temperature lower than a first temperature $T_{sw}1$ and is a perpendicular magneto-anisotropy film at a temperature equal to or higher than the first temperature $T_{sw}1$, the first temperature being higher than room temperature, the control magnetic film is an in-plane magneto-anisotropy film at a temperature lower than a second temperature $T_{sw}2$ and is a perpendicular magneto-anisotropy film at a temperature equal to or higher than the second temperature $T_{sw}2$, the second temperature being higher than the room temperature, a relationship $T_{sw}1 < T_{sw}2$ is satisfied between the first temperature $T_{sw}1$ and the second temperature $T_{sw}2$, and the information recorded on the recording magnetic film is copied onto the readout magnetic film through the control magnetic film by the exchange-coupled force in a region of the recording layer structure whose temperature is equal to or higher than the second temperature $T_{sw}2$.

3. A magneto-optical recording medium according to claim 1, wherein the readout magnetic film is an in-plane magneto-anisotropy film at a temperature lower than a first temperature $T_{sw}1$ and is a perpendicular magneto-anisotropy film at a temperature equal to or higher than the first temperature $T_{sw}1$, the first temperature being higher than room temperature, with respect to a second temperature $T_{sw}2$ and a third temperature $T_{sw}3$, the control magnetic film is an in-plane magneto-anisotropy film at a temperature lower than the second temperature $T_{sw}2$, is a perpendicular magneto-anisotropy film at a temperature equal to or higher than the second temperature $T_{sw}2$ and lower than the third temperature $T_{sw}3$, and is an in-plane magneto-anisotropy film at a temperature equal to or higher than the third temperature $T_{sw}3$, each of the second temperature and the third temperature being higher than the room temperature a relationship $T_{sw}1 < T_{sw}2 < T_{sw}3$ is satisfied between the first temperature $T_{sw}1$, the second temperature $T_{sw}2$, and the third temperature $T_{sw}3$, and the information recorded on the recording magnetic film is copied onto the readout magnetic film through the control magnetic film by the exchange-coupled force in a region of the recording layer structure whose temperature is equal to or higher than the second temperature $T_{sw}2$ and lower than the third temperature $T_{sw}3$.

4. A magneto-optical recording medium according to claim 1, wherein the readout magnetic film is a perpendicular magneto-anisotropy film at a temperature from room temperature to a Curie temperature $T_c$, with respect to a second temperature $T_{sw}2$ and a third temperature $T_{sw}3$, the control magnetic film is an in-plane magneto-anisotropy film at a temperature lower than the second temperature $T_{sw}2$, is a perpendicular magneto-anisotropy film at a temperature equal to or higher than the second temperature $T_{sw}2$ and lower than the third temperature $T_{sw}3$, and is an in-plane magneto-anisotropy film at a temperature equal to or higher than the third temperature $T_{sw}3$, each of the second temperature and the third temperature being higher than the room temperature, a relationship $T_{sw}2 < T_{sw}3$ is satisfied between the second temperature $T_{sw}2$ and the third temperature $T_{sw}3$, and the information recorded on the recording magnetic film is copied onto the readout magnetic film through the control magnetic film by the exchange-coupled force in a region of the recording layer structure whose temperature is equal to or higher than the second temperature $T_{sw}2$ and lower than the third temperature $T_{sw}3$.

5. A magneto-optical recording medium according to claim 1, wherein a main component of a material for the control magnetic film is GdFeCo.

6. A method for reading out information from a magneto-optical recording medium having a substrate and a recording layer structure including at least a readout magnetic film, a control magnetic film, and a recording magnetic film formed on the substrate, the information being recorded and stored in the form of a magnetized direction of a domain on the recording magnetic film by irradiating recording light on and thereby heating the recording magnetic film and by impressing a recording magnetic field to the recording magnetic film, the information being read out from the magneto-optical recording medium by copying the magnetized direction of the domain of the recording magnetic film onto the readout magnetic film via the control magnetic film by an exchange-coupled force through irradiation of a readout light, the method comprising the steps of:

irradiating the readout light on and thereby heating the recording layer structure, raising a temperature in a predetermined region of the control magnetic film to a temperature equal to or higher than a predetermined temperature which is higher than room temperature so as to allow the control magnetic film to shift from an in-plane magneto-anisotropy film to a perpendicular magneto-anisotropy film, thereby copying information recorded on the recording magnetic film onto the readout magnetic film through the control magnetic film by the exchange-coupled force; and reading out the information copied onto the readout magnetic film by utilizing reflected readout light from the readout magnetic film.

7. A method for reading out information according to claim 6, wherein the readout magnetic film is an in-plane magneto-anisotropy film at a temperature lower than a first temperature $T_{sw}1$ and is a perpendicular magneto-anisotropy film at a temperature equal to or higher than the first temperature $T_{sw}1$, the first temperature being higher than room temperature, the control magnetic film is an in-plane magneto-anisotropy film at a temperature lower than a second temperature $T_{sw}2$ and is a perpendicular magneto-anisotropy film at a temperature equal to or higher than the second temperature $T_{sw}2$, the second temperature being higher than the room temperature, a relationship $T_{sw}1<T_{sw}2$ is satisfied between the first temperature $T_{sw}1$ and the second temperature $T_{sw}2$, and in the irradiation step, the information recorded on the recording magnetic film is copied onto the readout magnetic film through the control magnetic film by the exchange-coupled force in a region of the recording layer structure whose temperature is equal to or higher than the second temperature $T_{sw}2$ by raising the temperature in the predetermined region of the control magnetic film to the second temperature $T_{sw}2$ or higher.

8. A method for reading out information according to claim 6, wherein the readout magnetic film is an in-plane magneto-anisotropy film at a temperature lower than a first temperature $T_{sw}1$ and is a perpendicular magneto-anisotropy film at a temperature equal to or higher than the first temperature $T_{sw}1$, the first temperature being higher than room temperature, with respect to a second temperature $T_{sw}2$ and a third temperature $T_{sw}3$, the control magnetic film is an in-plane magneto-anisotropy film at a temperature lower than the second temperature $T_{sw}2$, is a perpendicular magneto-anisotropy film at a temperature equal to or higher than the second temperature $T_{sw}2$ and lower than the third temperature $T_{sw}3$, and is an in-plane magneto-anisotropy film at a temperature equal to or higher than the third temperature $T_{sw}3$, each of the second temperature and the third temperature being higher than the room temperature, a relationship $T_{sw}1<T_{sw}2<T_{sw}3$ is satisfied between the first temperature $T_{sw}1$, the second temperature $T_{sw}2$, and the third temperature $T_{sw}3$, and in the irradiation step, the information recorded on the recording magnetic film is copied onto the readout magnetic film through the control magnetic film by the exchange-coupled force in a region of the recording layer structure whose temperature is equal to or higher than the second temperature $T_{sw}2$ and lower than the third temperature $T_{sw}3$ by raising the temperature in the predetermined region of the control magnetic film to the second temperature $T_{sw}2$ or higher and further raising a temperature of a part of the predetermined region to the third temperature $T_{sw}3$ or higher.

9. A method for reading out information according to claim 6, wherein the readout magnetic film is a perpendicular magneto-anisotropy film at a temperature from room temperature to a Curie temperature Tc, with respect to a second temperature $T_{sw}2$ and a third temperature $T_{sw}3$, the control magnetic film is an in-plane magneto-anisotropy film at a temperature lower than the second temperature $T_{sw}2$, is a perpendicular magneto-anisotropy film at a temperature equal to or higher than the second temperature $T_{sw}2$ and lower than the third temperature $T_{sw}3$, and is an in-plane magneto-anisotropy film at a temperature equal to or higher than the third temperature $T_{sw}3$, each of the second temperature and the third temperature being higher than room temperature, a relationship $T_{sw}2<T_{sw}3$ is satisfied between the second temperature $T_{sw}2$ and the third temperature $T_{sw}3$, and in the irradiation step, the information recorded on the recording magnetic film is copied onto the readout magnetic film through the control magnetic film by the exchange-coupled force in a region of the recording layer structure whose temperature is equal to or higher than the second temperature $T_{sw}2$ and lower than the third temperature $T_{sw}3$ by raising the temperature in the predetermined region of the control magnetic film to the second temperature $T_{sw}2$ or higher and further raising a temperature of a part of the predetermined region to the third temperature $T_{sw}3$ or higher.

10. A method for reading out information according to claim 6, further comprising the step of impressing a readout magnetic field to the recording layer structure, a direction of the readout magnetic field being in perpendicular with respect to a surface of the magneto-optical recording medium.

* * * * *